(12) United States Patent
Richter et al.

(10) Patent No.: US 10,954,964 B2
(45) Date of Patent: Mar. 23, 2021

(54) GAS TURBINE ENGINE AND PANEL FOR A GAS TURBINE ENGINE

(71) Applicants: Rolls-Royce Deutschland Ltd & Co KG, Blankenfelde-Mahlow (DE); Rolls-Royce plc, London (GB)

(72) Inventors: Christoph Richter, Berlin (DE); Tom Hilton, Derby (GB)

(73) Assignees: Rolls-Royce Deutschland Ltd & Co KG, Blankenfelde-Mahlow (DE); Rolls-Royce plc, London (GB)

( * ) Notice: Subject to any disclaimer, the term of this patent is extended or adjusted under 35 U.S.C. 154(b) by 154 days.

(21) Appl. No.: 16/255,384

(22) Filed: Jan. 23, 2019

(65) Prior Publication Data

US 2020/0025092 A1   Jan. 23, 2020

(30) Foreign Application Priority Data

Mar. 26, 2018   (DE) .................... 10 2018 107 096.9

(51) Int. Cl.
*F04D 29/66* (2006.01)
*F04D 29/52* (2006.01)
*F04D 29/40* (2006.01)

(52) U.S. Cl.
CPC .......... *F04D 29/664* (2013.01); *F04D 29/522* (2013.01); *F04D 29/403* (2013.01); *F05D 2220/323* (2013.01); *F05D 2260/96* (2013.01)

(58) Field of Classification Search
CPC ........ F04D 29/40; F04D 29/403; F04D 29/52; F04D 29/522; F04D 29/526; F04D 29/66; F04D 29/661; F04D 29/663; F04D 29/664
See application file for complete search history.

(56) References Cited

U.S. PATENT DOCUMENTS 5,060,471 A   10/1991   Torkelson
5,336,044 A * 8/1994   Forrester ............... F01D 21/045
                                                            415/9
(Continued)

FOREIGN PATENT DOCUMENTS

EP   0572725 A1   12/1993
EP   1398473 A1   3/2004
(Continued)

OTHER PUBLICATIONS

European Search Report dated Jul. 30, 2019 for counterpart European Patent Application No. 19160501.3.
(Continued)

*Primary Examiner* — Richard A Edgar
(74) *Attorney, Agent, or Firm* — Shuttleworth & Ingersoll, PLC; Timothy Klima

(57) ABSTRACT

A gas turbine engine for an aircraft includes: a flow path boundary, which delimits the flow path through the engine radially on the outside, and a lining, which lines the flow path boundary on the inside, at least along an axial section. Here, the lining includes a plurality of panels, which, in the circumferential direction of the flow path boundary, adjoin each other and which together line a circumferential area of 360°, wherein each panel has two end faces, which each adjoin an end face of an adjacent panel. The panels are of beveled design at their end faces, such that two mutually adjoining panels form a V-shaped gap between them, the minimum clearance of which is realized at the inside of the panels. The panels can be sound-absorbing panels. Also disclosed is a panel for a gas turbine engine.

17 Claims, 6 Drawing Sheets

(56) References Cited

U.S. PATENT DOCUMENTS

| | | |
|---|---|---|
| 6,772,857 B2 | 8/2004 | Porte et al. |
| 7,762,086 B2 * | 7/2010 | Schwark ............... F01D 25/285 60/796 |
| 7,798,285 B2 | 9/2010 | Chiou et al. |
| 2004/0045765 A1 | 3/2004 | Porte |
| 2015/0016945 A1 * | 1/2015 | Kappes ................ F01D 21/045 415/1 |
| 2015/0285151 A1 | 10/2015 | Sfarti et al. |
| 2016/0169043 A1 | 6/2016 | Read et al. |

FOREIGN PATENT DOCUMENTS

| | | |
|---|---|---|
| FR | 2976974 A1 | 12/2012 |
| FR | 2995360 A1 | 3/2014 |
| GB | 2273131 A | 6/1994 |

OTHER PUBLICATIONS

German Search Report dated Oct. 11, 2018 for counterpart German Patent Application No. De 10 2018 107 096.9.

* cited by examiner

GAS TURBINE ENGINE AND PANEL FOR A GAS TURBINE ENGINE

This application claims priority to German Patent Application DE102018107096.9 filed Mar. 26, 2018, the entirety of which is incorporated by reference herein.

The invention relates to a gas turbine engine and a panel for use in a gas turbine engine as disclosed herein.

To reduce engine noise, there is a known practice of providing the radially outer boundary of the flow path through a gas turbine engine with a sound-absorbing lining in the region in front of the fan. Such a lining can comprise a plurality of sound-absorbing panels, which are fitted together flush in the circumferential direction and overall form a hollow-cylindrical lining.

There is a requirement to provide a gas turbine engine with a sound-absorbing lining which can be installed and removed in a simple manner and nevertheless provides a uniform acoustic boundary condition in the circumferential direction. There is also a requirement for a lining which can be installed and removed in a simple manner in relation to a lining of non-sound-absorbing design for a gas turbine engine.

Accordingly, it is the underlying object of the present invention to make available a gas turbine engine with a lining which can be installed and removed in a simple manner.

This object is achieved by a gas turbine engine and a panel having features as disclosed herein. Embodiments of the invention are indicated in the present disclosure.

According to this, in a first aspect of the invention, the invention considers a gas turbine engine which has: a flow path boundary, which delimits the flow path through the gas turbine engine radially on the outside, and a lining, which lines the flow path boundary on the inside, at least along an axial section. Here, the lining comprises a plurality of panels, which, in the circumferential direction of the flow path boundary, adjoin each other and which together line a circumferential area of 360°, and wherein each panel has two end faces, which each adjoin an end face of an adjacent panel.

It is envisaged that the panels are of beveled design at their end faces, with the result that two mutually adjoining panels form a V-shaped gap between them. To minimize acoustic disadvantages, this gap reaches the minimum clearance between adjacent panels at the inside in contact with the main flow path through the engine, i.e. the acoustically permeable side of the panels. The situation here is such that the end faces adopt an acute angle to the inside and an obtuse angle to the outside of the panel.

According to one embodiment of the invention, the panels are designed as sound-absorbing panels. As an alternative, the panels can serve merely to contribute to aerodynamically advantageous lining of the flow path boundary. The following description assumes that the panels are designed as sound-absorbing panels. The embodiments apply in corresponding fashion to panels composed of a non-sound-absorbing material.

The solution according to the invention makes it possible or easier to remove the individual panels in a radial direction, i.e. to release them radially inwards from the lining and remove them from the engine pod, when disassembling the lining, as is required, for example, for maintenance work. In corresponding fashion, the individual panels can be inserted in a radial direction for assembly of the lining.

This is not possible when the end faces of the panels are of straight design, wherein the end faces of the panels rest in full surface contact with one another in the lining, owing to the fact that the panels have to have a certain thickness between the acoustically permeable flow surface and the hard rear wall in order to achieve the desired sound absorption. The invention thus enables easy and effective handling of the individual panels in respect of the assembly and disassembly of the lining.

Accordingly, one embodiment of the invention envisages that the V-shaped gap is formed in such a way that it allows the panels to be removed radially inwards from the lining during disassembly of the lining. However, attention is drawn to the fact that the invention also has advantages even at angles at which a panel cannot readily be removed in a radial direction from the lining, with further measures being required for this purpose.

One embodiment of the invention envisages that the angle which two mutually adjoining beveled end faces enclose with one another is greater than zero and less than or equal to 45°. For example, provision can be made for said angle to be in a range between 35° and 45°.

According to one embodiment of the invention, the panels have, in cross section a radially inner inside curved in a substantially circular arc and having a first arc length and a radially outer outside curved in a substantially circular arc and having a second arc length. In this case, the radial distance between the inside and the outside defines a total thickness of the panels.

Here, the cross section considered is perpendicular to the machine axis of the associated engine or perpendicular to a local, or even approximate, axis of symmetry through the engine nacelle. If the engine nacelle is of exactly circular design, the inside and the outside of the panels also have a circular profile. If the engine nacelle deviates from an exact circular shape, which is likewise possible, the inside and the outside of the panels have an approximately circular profile in cross section. The wording "substantially circular" takes account of this fact.

In this context, one embodiment of the invention envisages that the first arc length of the panels on the inside is equal to the second arc length of the panels on the outside. This leads to the formation of an angle between the end faces of mutually adjoining panels which allows removal of the panels in a radial direction.

Another embodiment of the invention envisages that the panels have, between the inside and the outside, at least one layer which, when laid out flat, consists of prismatic cells with a polygonal base surface. After installation in the engine and appropriate bending, the cells have the shape of truncated pyramids. These are hollow cells. The cells have a hexagonal, quadrilateral or, more generally, polygonal base surface, for example, and form a multiplicity of cells. The layer of prismatic cells can also have one or more further acoustically permeable layers with a flow resistance optimized for acoustic damping in a virtually perpendicular orientation relative to the cross-sectional axis of the cells.

In this case, provision can be made for the panels to be of sandwich-type construction, wherein a covering layer rests radially on the outside of the layer consisting of prismatic cells and a perforated inner layer rests radially on the inside thereof. The covering layer forms the outside of the panel and can also perform structural tasks. The covering layer can also be omitted or its function can be incorporated into the component adjoining the acoustic panel radially on the outside, e.g. a fan housing. The acoustically permeable inner layer can be provided with perforations in the form of holes for damping the engine noise, for example. The acoustically permeable inner layer or a layer adjoining the latter forms the inside of the panel.

In principle, the layer of prismatic cells can be composed of any material by means of which a corresponding structure, e.g. a honeycomb structure, can be obtained. The material is composed of glass fibers, aluminum or Nomex® fibers, for example. Instead of a hexagonal honeycomb structure, square, rectangular or complex cell structures which have a substantially constant cross-sectional area of the cells and thus have an extremely low flow resistance in a direction perpendicular to the walls are also possible according to the invention, as already observed. According to the invention, the cells are mounted in such a way that an open side of the cells is mounted on the acoustically permeable inside and the other side is closed by the covering layer.

Another embodiment of the invention envisages that the prismatic cells on the end faces of the sound-absorbing panels extend parallel to the respective end face. With their principal axis, they adopt a similarly acute or obtuse angle to the inner layer or covering layer as the respective end face. Extension parallel to the respective end face means, in particular, that the prismatic cells adjoining the respective end face are not cut into or cut through. Accordingly, the acoustic properties of the panel do not change in the circumferential direction and, in particular, at the respective end face. Thus, the optimum damping function for the engine noise and, in particular for the engine notes, is achieved. If they were cut through at the end face, variable acoustic properties would be obtained in the circumferential direction, and would lead to a considerable reduction in acoustic damping.

In order to ensure that the prismatic cells adjoining the respective end face extend parallel to the panel, it is necessary for the prismatic cells to be oriented obliquely, deviating from an exact radial alignment. Ideally, the depth of the prismatic cells is maintained here, with the result that the acoustic waves propagating perpendicularly to the cross-sectional axis of the cells are confronted with the same cell depth at each circumferential position. This is associated with a certain reduction in the height of the panel overall in this region. While tolerating a greater or lesser reduction in the acoustic function, the height reduction can also be avoided if provision is made for the height of the prismatic cells to become larger towards the end faces of a panel. In the installed, bent state of the panels, the thicknesses is then constant.

Another embodiment of the invention envisages that the V-shaped gap which is formed between in each case two end faces of mutually adjoining panels is filled with a filler material. The filler is silicone, for example. A filler of this kind is introduced into the V-shaped gap in an axial direction, for example. In this case, provision can be made for the filler material also to contribute to the filling of a gap due to manufacturing tolerances, which extends in the circumferential direction between two panels adjoining one another at their end faces. The use of a filler makes it possible to avoid whistling sounds and resonance at the gap.

Embodiments of the invention envisage that the lining has between two and eight, in particular four to six, panels. However, this should only be taken as an example. Here, the situation is such that the number of panels and the thickness thereof affect the angle which two adjoining end faces must form with one another to enable the panels to be removed in a radial direction during disassembly.

Another embodiment of the invention envisages that the inside is not acoustically permeable, and acoustic damping by the panels is thus omitted. Such an acoustically inactive panel can be used, for example, to aerodynamically line the region axially in front of the liner of the fan housing of the gas turbine engine.

According to one illustrative embodiment of the invention, the lining is formed on a fan housing. There, it is situated axially directly in front of the fan or fan blades. In particular, provision can be made for the lining to be formed on the fan housing at least partially along the axial section between the blade tip of the fan blades and the "A1 flange". However, this should only be taken as an example. In principle, the lining designed in accordance with the invention can be provided in any axial region of the flow path boundary which forms the gas turbine engine, in particular in front of the fan, e.g. additionally or alternatively in the engine inlet of the engine nacelle and/or in the region between the fan and the rotor arranged downstream of the fan in the bypass duct and/or even behind the rotor.

According to one embodiment of the invention, it is envisaged that the gas turbine engine is designed as a geared fan and accordingly has:
  an engine core, which comprises a turbine, a compressor and a turbine shaft, which connects the turbine to the compressor and is designed as a hollow shaft;
  a fan, which is positioned upstream of the engine core, wherein the fan comprises a plurality of fan blades; and
  a transmission, which receives an input from the turbine shaft and outputs drive for the fan in order to drive the fan at a lower speed than the turbine shaft.

Provision can furthermore be made for the gas turbine engine to be developed in such a way that
  the turbine is a first turbine, the compressor is a first compressor and the turbine shaft is a first turbine shaft;
  the engine core furthermore comprises a second turbine, a second compressor and a second turbine shaft, which connects the second turbine to the second compressor; and
  the second turbine, the second compressor and the second turbine shaft are arranged in such a way as to rotate at a higher speed than the first turbine shaft.

However, attention is drawn to the fact that the invention can be used in any gas engines or turbofan engines, even those which are not designed as geared-fan engines.

According to another aspect, the invention relates to a panel, which is provided and suitable for the formation, together with further panels, of a lining of a flow path boundary of a gas turbine engine. In this case, the panel has two end faces, which are each provided to adjoin one end face of an adjacent panel. It is envisaged that the panel is of beveled design at its end faces, with the result that two mutually adjoining panels form a V-shaped gap between them, the minimum clearance of which is realized at the inside of the panel.

Thus, provision can be made for the panel to be of beveled design at its end faces, such that it is suitable for removal radially inwards from an anchoring point in a gas turbine engine during disassembly. If the lining is formed on the fan housing along the axial section between the blade tip of the fan blades and the "A1 flange", such radial removal of the panel is possible here without releasing the engine inlet from the A1 flange.

It is furthermore possible to envisage that, in cross section, the panel has a radially inner inside curved in a substantially circular arc and having a first arc length and a radially outer outside curved in a substantially circular arc and having a second arc length, wherein the first arc length of the panel on the inside is equal to the second arc length of the panel on the outside.

Another embodiment of the panel envisages that the panel is of sound-absorbing design and has a layer which, when laid out flat, consists of prismatic cells with a polygonal base surface, e.g. consists of a honeycomb cells. In this context, provision can be made for the prismatic cells on the end faces of the sound-absorbing panel to extend parallel to the respective end face.

According to one embodiment, the cells are provided with further acoustically permeable layers, which have a flow resistance chosen to optimize sound absorption. In this case, provision can be made for the cell structure to be interrupted by the additional layers.

Attention is drawn to the fact that the present invention, insofar as it relates to an aircraft engine, is described with reference to a cylindrical coordinate system which has the coordinates x, r and cp. Here, x indicates the axial direction, r the radial direction and β the angle in the circumferential direction. In this case, the axial direction is defined by the longitudinal axis of the engine nacelle, which is identical with the machine axis of an associated engine. Starting from the axial direction, the radial direction points radially outwards. Terms such as "in front of", "behind", "front" and "rear" relate to the axial direction or flow direction in the engine. Terms such as "outer" or "inner" relate to the radial direction.

As stated at another location here, the present disclosure can relate to a gas turbine engine. A gas turbine engine of this kind can comprise an engine core, which comprises a turbine, a combustion chamber, a compressor and a core shaft connecting the turbine to the compressor. A gas turbine engine of this kind can comprise a fan (with fan blades), which is positioned upstream of the engine core.

Arrangements of the present disclosure can be advantageous especially but not exclusively for fans which are driven via a transmission. Accordingly, the gas turbine engine can comprise a transmission, which receives an input from the core shaft and outputs drive for the fan in order to drive the fan at a lower speed than the core shaft. The input for the transmission can be directly from the core shaft or indirectly from the core shaft, e.g. via a spur shaft and/or a spur gear. The core shaft can be rigidly connected to the turbine and the compressor, ensuring that the turbine and the compressor rotate at the same speed (wherein the fan rotates at a lower speed).

The gas turbine engine which is described and/or claimed here can have any suitable general architecture. For example, the gas turbine engine can have any desired number of shafts connecting turbines and compressors, e.g. one, two or three shafts. Purely by way of example, the turbine connected to the core shaft can be a first turbine, the compressor connected to the core shaft can be a first compressor, and the core shaft can be a first core shaft. The engine core can furthermore comprise a second turbine, a second compressor and a second core shaft, which connects the second turbine to the second compressor. The second turbine, the second compressor and the second core shaft can be arranged in such a way as to rotate at a higher speed than the first core shaft.

With such an arrangement, the second compressor can be positioned axially downstream of the first compressor. The second compressor can be arranged in such a way as to receive a flow from the first compressor (e.g. to receive it directly, e.g. via a generally annular channel).

The transmission can be arranged so as to be driven by the core shaft (e.g. the first core shaft in the above example), which is configured to rotate with the lowest speed (e.g. in use). For example, the transmission can be arranged so as to be driven only by the core shaft (e.g. only by the first core shaft and not by the second core shaft in the above example), which is configured to rotate with the lowest speed (e.g. in use). As an alternative, the transmission can be arranged so as to be driven by one or more shafts, e.g. the first and/or the second shaft in the above example.

In a gas turbine engine which is described and/or claimed here, a combustion chamber can be provided axially downstream of the fan and of the compressor (compressors). For example, the combustion chamber can be directly downstream of the second compressor (e.g. at the outlet thereof) if a second compressor is provided. As another example, the flow at the outlet of the compressor can be fed to the inlet of the second turbine if a second turbine is provided. The combustion chamber can be provided upstream of the turbine (turbines).

The compressor or compressors (e.g. the first compressor and the second compressor according to the above description) can comprise any number of stages, e.g. several stages. Each stage can comprise a series of rotor blades and a series of stator blades, which can be variable stator blades (such that the angle of attack thereof can be variable). The series of rotor blades and the series of stator blades can be axially offset from one another.

The turbine or turbines (e.g. the first turbine and the second turbine according to the above description) can comprise any number of stages, e.g. several stages. Each stage can comprise a series of rotor blades and a series of stator blades. The series of rotor blades and the series of stator blades can be axially offset from one another.

Each fan blade can be defined with a radial span which extends from a root (or a hub) at a radially inner location, over which gas flows, or at a position of a span of 0% to a tip at a position of a span of 100%. The ratio of the radius of the fan blades at the hub to the radius of the fan blades at the tip can be less than (or of the order of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blades at the hub to the radius of the fan blades at the tip can be in an inclusive range which is bounded by two of the values in the above set (i.e. the values can form upper or lower limits). In general terms, these ratios can be referred to as the hub-tip ratio. The radius of the hub and the radius at the tip can both be measured at the leading edge part (or the edge which is axially furthest towards the front). Of course, the hub-tip ratio relates to that section of the fan blades over which gas flows, i.e. the section which is situated radially to the outside of any platform.

The radius of the fan can be measured between the center line of the engine and the tip of the fan blades at the leading edge thereof. The diameter of the fan (which can simply be twice the radius of the fan) can be greater than (or of the order of): 250 cm (about 100 inches), 260 cm, 270 cm (about 105 inches), 280 cm (about 110 inches), 290 cm (about 115 inches), 300 cm (about 120 inches), 310 cm, 320 cm (about 125 inches), 330 cm (about 130 inches), 340 cm (about 135 inches), 350 cm, 360 cm (about 140 inches), 370 cm (about 145 inches), 380 cm (about 150 inches) or 390 cm (about 155 inches). The fan diameter can be in an inclusive range which is bounded by two of the values in the above set (i.e. the values can form upper or lower limits).

The speed of the fan can vary during use. In general, the speed is lower for fans with a larger diameter. Purely as a nonrestrictive example, the speed of the fan can be less than 2500 rpm, e.g. less than 2300 rpm, under constant speed conditions. Purely as a further nonrestrictive example, the speed of the fan under constant speed conditions for an engine with a fan diameter in a range of 250 cm to 300 cm (e.g. 250 cm to 280 cm) can be in a range of 1700 rpm to 2500 rpm, e.g. in a range of 1800 rpm to 2300 rpm, e.g. in a range of 1900 rpm to 2100 rpm. Purely as a further nonrestrictive example, the speed of the fan under constant speed conditions for an engine with a fan diameter in a range of 320 cm to 380 cm can be in a range of 1200 rpm to 2000 rpm, e.g. in a range of 1300 rpm to 1800 rpm, e.g. in a range of 1400 rpm to 1600 rpm.

During the use of the gas turbine engine, the fan rotates (with associated fan blades) about an axis of rotation. This rotation has the effect that the tip of the fan blades moves at a speed $U_{tip}$. The work performed on the flow by the fan blades results in a rise in the enthalpy dH of the flow. A fan tip load can be defined as $dH/U_{tip}^2$, where dH is the enthalpy rise (e.g. the average 1-D enthalpy rise) across the fan and $U_{tip}$ is the (translational) speed of the fan tip, e.g. at the leading edge of the tip, (which can be defined as the fan tip radius at the leading edge multiplied by the angular speed). The fan tip loading under constant speed conditions can be more than (or of the order of): 0.3, 0.31, 0.32, 0.33, 0.34, 0.35, 0.36, 0.37, 0.38, 0.39 or 0.4 (where all units in this section are in $Jkg^{-1}K^{-1}/(ms^{-1})^2$). The fan tip load can be in an inclusive range which is bounded by two of the values in the above set (i.e. the values can form upper or lower limits).

Gas turbine engines according to the present disclosure can have any desired bypass ratio, wherein the bypass ratio is defined as the ratio of the mass flow rate of the flow through the bypass duct to the mass flow rate of the flow through the core under constant speed conditions. In some arrangements, the bypass ratio can be more than (of the order of): 10, 10.5, 11, 11.5, 12, 12.5, 13, 13.5, 14, 14.5, 15, 15.5, 16, 16.5, or 17. The bypass ratio can be in an inclusive range which is bounded by two of the values in the above set (i.e. the values can form upper or lower limits). The bypass duct can be substantially annular. The bypass duct can be situated radially outside the engine core. The radially outer surface of the bypass duct can be defined by an engine nacelle and/or a fan housing.

The total pressure ratio of a gas turbine engine which is described and/or claimed here can be defined as the ratio of the dynamic pressure upstream of the fan to the dynamic pressure at the outlet of the highest-pressure compressor (in front of the inlet to the combustion chamber). As a nonrestrictive example, the total pressure ratio of a gas turbine engine which is described and/or claimed here at constant speed can be more than (or of the order of): 35, 40, 45, 50, 55, 60, 65, 70 or 75. The total pressure ratio can be in an inclusive range which is bounded by two of the values in the above set (i.e. the values can form upper or lower limits).

The specific thrust of an engine can be defined as the net thrust of the engine divided by the total mass flow through the engine. Under constant speed conditions, the specific thrust of an engine which is described and/or claimed here can be less than (or of the order of): 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust can be in an inclusive range which is bounded by two of the values in the above set (i.e. the values can form upper or lower limits). Such engines can be particularly efficient in comparison with conventional gas turbine engines.

A gas turbine engine which is described and/or claimed here can have any desired maximum thrust. Purely as a nonrestrictive example, a gas turbine which is described and/or claimed here may be capable of producing a maximum thrust of at least (or of the order of): 160 kN, 170 kN, 180 kN, 190 kN, 200 kN, 250 kN, 300 kN, 350 kN, 400 kN, 450 kN, 500 kN or 550 kN. The maximum thrust can be in an inclusive range which is bounded by two of the values in the above set (i.e. the values can form upper or lower limits). The thrust to which reference is made above can be the net maximum thrust under standard atmospheric conditions at sea level +15° C. (ambient pressure 101.3 kPa, temperature 30° C.) in the case of a static engine.

In use, the temperature of the flow at the inlet of the high-pressure turbine can be particularly high. This temperature, which can be referred to as TET, can be measured at the outlet to the combustion chamber, e.g. directly upstream of the first turbine blade, which can in turn be referred to as the nozzle guide vane. At constant speed, the TET can be at least (or of the order of): 1400K, 1450K, 1500K, 1550K, 1600K or 1650K. The TET at constant speed can be in an inclusive range which is bounded by two of the values in the above set (i.e. the values can form upper or lower limits). The maximum TET during the use of the engine can, for example, be at least (or of the order of): 1700K, 1750K, 1800K, 1850K, 1900K, 1950K or 2000K. The maximum TET can be in an inclusive range which is bounded by two of the values in the above set (i.e. the values can form upper or lower limits). The maximum TET can occur, for example, under a condition of high thrust, e.g. at an MTO (MTO—maximum takeoff thrust—maximum starting thrust).

A fan blade and/or a blade section of a fan blade which is described and/or claimed here can be produced from any suitable material or from a combination of materials. For example, at least some of the fan blade and/or of the blade can be produced at least in part from a composite material, e.g. a metal matrix composite and/or a composite material with an organic matrix, e.g. carbon fiber. As a further example, at least some of the fan blade and/or of the blade can be produced at least in part from a metal, e.g. a metal based on titanium or a material based on aluminum (e.g. an aluminum-lithium alloy) or a material based on steel. The fan blade can comprise at least two regions produced using different materials. For example, the fan blade can have a protective leading edge produced using a material which can better withstand impacts (e.g. by birds, ice or other material) than the remainder of the blade. Such a leading edge can be produced using titanium or an alloy based on titanium, for example. Thus, purely by way of example, the fan blade can have a body based on carbon fiber or aluminum (e.g. an aluminum-lithium alloy) with a leading edge made of titanium.

A fan which is described and/or claimed here can comprise a central section from which the fan blades can extend, e.g. in a radial direction. The fan blades can be mounted on the central section in any desired manner. For example, each fan blade can comprise a fixing device, which can enter into engagement with a corresponding slot in the hub (or disk). Purely as an example, a fixing device of this kind can be in the form of a dovetail, which can be inserted into a corresponding slot in the hub/disk and/or brought into engagement therewith in order to fix the fan blade on the hub/disk. As another example, the fan blades can be formed integrally with a central section. Such an arrangement can be referred to as a blisk or a bling. Any suitable method can be used to produce such a blisk or such a bling. For example, at least some of the fan blades can be machined from a block and/or at least some of the fan blades can be mounted on the hub/disk by welding, e.g. linear friction welding.

The gas turbine engines which are described and/or claimed here can be provided with a VAN (variable area nozzle–nozzle of variable cross section) or not. Such a nozzle of variable cross section can allow variation of the outlet cross section of the bypass duct during use. The general principles of the present disclosure can apply to engines with or without a VAN.

The fan of the gas turbine which is described and/or claimed here can have any desired number of fan blades, e.g. 16, 18, 20 or 22 fan blades.

According to the use which is implemented here, constant speed conditions can mean constant speed conditions of an aircraft on which the gas turbine engine is mounted. Conventionally speaking, such constant speed conditions can be defined as the conditions during the central part of the flight, e.g. the conditions to which the aircraft and/or the engine are exposed between the end of the initial ascent and the start of the final descent (in respect of time and/or distance).

Purely as an example, the forward speed under the constant speed condition at any point can be in a range of Mach 0.7 to 0.9, e.g. 0.75 to 0.85, e.g. 0.76 to 0.84, e.g. 0.77 to 0.83, e.g. 0.78 to 0.82, e.g. 0.79 to 0.81, e.g. of the order of Mach 0.8, of the order of Mach 0.85 or in a range of 0.8 to 0.85. Any speed within these ranges can be the constant travel condition. In the case of some aircraft, the constant travel conditions can be outside these ranges, e.g. below Mach 0.7 or above Mach 0.9.

Purely as an example, the constant speed conditions can correspond to standard atmospheric conditions at an altitude in a range of 10,000 m to 15,000 m, e.g. in a range of 10,000 m to 12,000 m, e.g. in a range of 10,400 m to 11,600 m (about 38,000 feet), e.g. in a range of 10,500 m to 11,500 m, e.g. in a range of 10,600 m to 11,400 m, e.g. in a range of 10,700 m (about 35,000 feet) to 11,300 m, e.g. in a range of 10,800 m to 11,200 m, e.g. in a range of 10,900 m to 11,100 m, e.g. of the order of 11,000 m. The constant speed conditions can correspond to standard atmospheric conditions at any given altitude in these ranges.

Purely as an example, the constant speed conditions can correspond to the following: a forward Mach number of 0.8; a pressure of 23,000 Pa and a temperature of −55° C.

As used throughout here, "constant speed" or "constant speed conditions" can signify the aerodynamic design point. Such an aerodynamic design point (or ADP) can correspond to the conditions (including, for example, the Mach number, ambient conditions and thrust requirement) for which the fan operation is designed. This can, for example, signify the conditions under which the fan (or the gas turbine engine) has the optimum efficiency in accordance with its design.

In use, a gas turbine engine which is described and/or claimed here can be operated under the constant speed conditions which are defined here at another location. Such constant speed conditions can be determined by the constant speed conditions (e.g. the conditions during the middle part of the flight) of an aircraft on which at least one (e.g. 2 or 4) gas turbine engine can be secured to supply thrust.

For a person skilled in the art, it is understandable that a feature or a parameter which is described in relation to one of the above aspects can be applied to any other aspect, provided they are not mutually exclusive. Moreover, any feature or any parameter which is described here can be applied to any aspect and/or combined with any other feature or parameter which is described here, provided they are not mutually exclusive.

The invention is explained in greater detail below by means of several illustrative embodiments with reference to the figures of the drawing. In the drawing.

Figure 1:
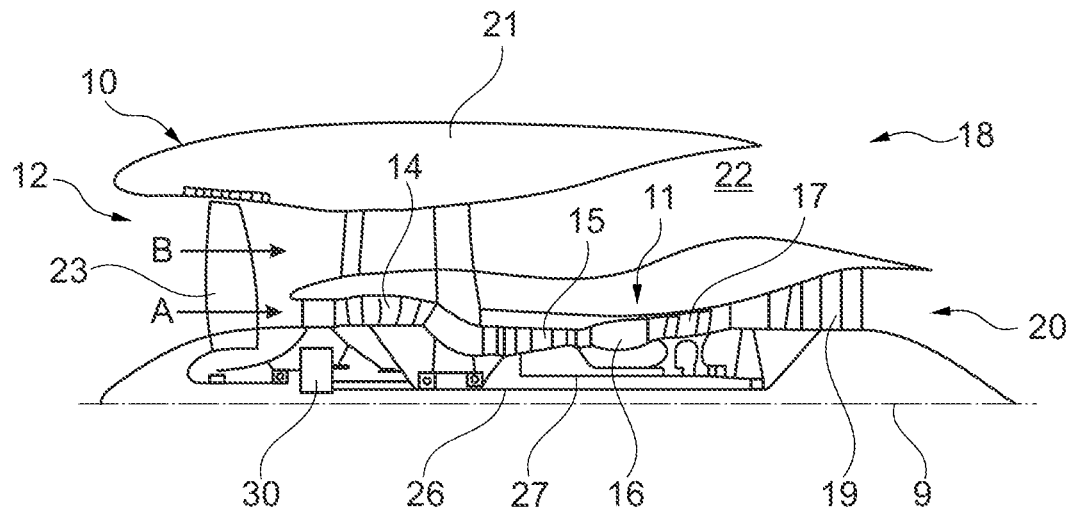
FIG. 1 shows a sectional view from the side of a gas turbine engine.

FIG. 1 illustrates a gas turbine engine 10 having a main axis of rotation 9. The engine 10 comprises an air inlet 12 and a thrust fan or fan 23, which produces two air flows: a core air flow A and a bypass air flow B. The gas turbine engine 10 comprises a core 11, which receives the core air flow A. The engine core 11 comprises, in the sequence of axial flow, a low-pressure compressor 14, a high-pressure compressor 15, a combustion device 16, a high-pressure turbine 17, a low-pressure turbine 19 and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is mounted on the low-pressure turbine 19 by means of a shaft 26 and an epicyclic transmission 30 and is driven by said turbine.

In use, the core air flow A is accelerated and compressed by the low-pressure compressor 14 and passed through the high-pressure compressor 15, where further compression takes place. The compressed air expelled from the high-pressure compressor 15 is introduced into the combustion device 16, where it is mixed with fuel and the mixture is burnt. The resulting hot combustion products then propagate through the high-pressure and the low-pressure turbine 17, 19 and thereby drive said turbines, before they are expelled through the nozzle 20 to provide a certain thrust. The high-pressure turbine 17 drives the high-pressure compressor 15 by means of a suitable connecting shaft 27. Generally speaking, the fan 23 provides the majority of the thrust. The epicyclic transmission 30 is a reduction gear.

Figure 2:
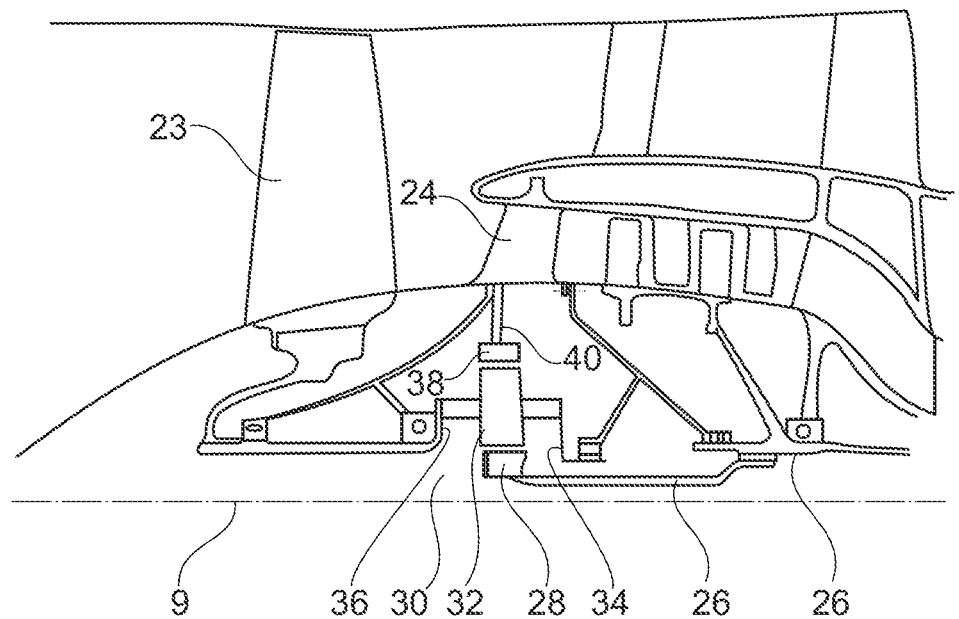
FIG. 2 shows an enlarged sectional view from the side of an upstream section of a gas turbine engine.

An illustrative arrangement of a gas turbine engine 10 with a geared fan is shown in FIG. 2. The low-pressure turbine 19 (see FIG. 1) drives the shaft 26, which is coupled to a sun gear 28 of the epicyclic transmission arrangement 30. A plurality of planet gears 32, which are coupled to one another by a planet carrier 34, is situated radially to the outside of the sun gear 28 and mesh therewith. The planet carrier 34 restricts the planet gears 32 to revolving synchronously around the sun gear 28, while allowing each planet gear 32 to rotate about its own axis. The planet carrier 34 is coupled to the fan 23 via links 36 in such a way as to drive the rotation thereof around the engine axis 9. An annulus or ring gear 38, which is coupled by links 40 to a stationary supporting structure 24, is situated radially to the outside of the planet gears 32 and meshes therewith.

It is observed that the terms "low-pressure turbine" and "low-pressure compressor", as used here, can be interpreted as signifying the turbine stage with the lowest pressure and the compressor stage with the lowest pressure (i.e. they do not include the fan 23) and/or the turbine and compressor stage which are connected to one another by the connecting shaft 26 with the lowest speed in the engine (i.e. it does not include the transmission output shaft driving the fan 23). In some documents, the "low-pressure turbine" and the "low-pressure compressor" to which reference is made here can alternatively be known as the "medium-pressure turbine" and the "medium-pressure compressor". When using such alternative nomenclature, the fan 23 can be referred to as a first compression stage or compression stage with the lowest pressure.

Figure 3:
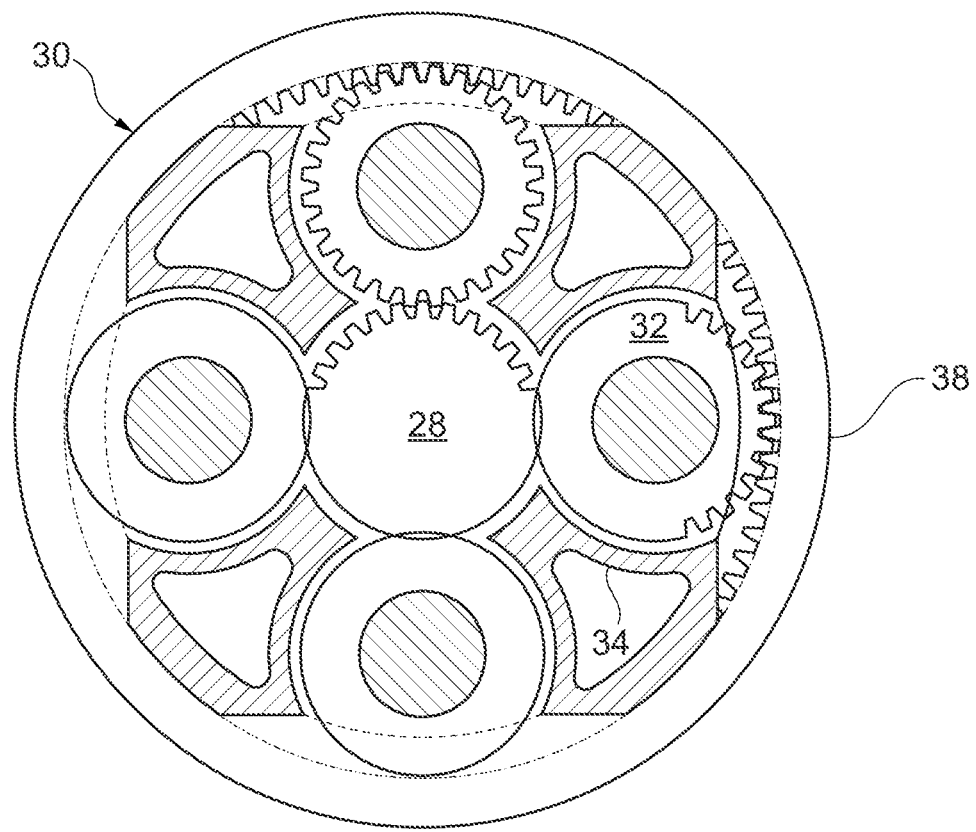
FIG. 3 shows a partially cutaway view of a transmission for a gas turbine engine.

The epicyclic transmission 30 is shown in greater detail by way of example in FIG. 3. The sun gear 28, the planet gears 32 and the ring gear 38 each comprise teeth around the periphery thereof for meshing with the other gears. For the sake of clarity, however, only illustrative segments of the teeth are illustrated in FIG. 3. Although four planet gears 32 are illustrated, it is obvious for a person skilled in the art that a larger or smaller number of planet gears 32 can be provided within the scope of protection of the claimed invention. Practical applications of an epicyclic transmission 30 generally comprise at least three planet gears 32.

The epicyclic transmission 30 illustrated by way of example in FIGS. 2 and 3 is a planetary transmission in which the planet carrier 34 is coupled to an output shaft by links 36, wherein the ring gear 38 is fixed. However, any other suitable type of epicyclic transmission 30 can be used. As another example, the epicyclic transmission 30 can be a star arrangement, in which the planet carrier 34 is held fast but the ring gear (or annulus) 38 is allowed to rotate. In such an arrangement, the fan 23 is driven by the ring gear 38. As another alternative example, the transmission 30 can be a differential transmission, in which both the ring gear 38 and the planet carrier 34 are allowed to rotate.

It is self-evident that the arrangement shown in FIGS. 2 and 3 is purely illustrative and that various alternatives are within the scope of protection of the present disclosure. Purely by way of example, any suitable arrangement for positioning the transmission 30 in the engine 10 and/or for connecting the transmission 30 to the engine 10 can be used. As a further example, the connections (e.g. the links 36, 40 in the example in FIG. 2) between the transmission 30 and other parts of the engine 10 (e.g. the input shaft 26, the output shaft and the fixed structure 24) can have a certain degree of stiffness or flexibility. As a further example, any suitable arrangement of the bearings between rotating and stationary parts of the engine (e.g. between the input and the output shaft of the transmission and the fixed structures, e.g. the transmission housing) can be used, and the disclosure is not restricted to the illustrative arrangement in FIG. 2. For example, it is readily apparent to a person skilled in the art that the arrangement of the output and supporting links and bearing positions in the case of a star arrangement (described above) of the transmission 30 would generally differ from those shown by way of example in FIG. 2.

Accordingly, the present disclosure extends to a gas turbine engine having any arrangement of the types of transmission (e.g. in a star shape or of a planetary type), supporting structures, input and output shaft arrangement and bearing positions.

Optionally, the transmission can drive secondary and/or alternative components (e.g. the medium-pressure compressor and/or booster).

Other gas turbine engines in which the present disclosure can be used can have alternative configurations. For example, engines of this kind can have an alternative number of compressors and/or turbines and/or an alternative number of connecting shafts. As a further example, the gas turbine engine shown in FIG. 1 has a split flow nozzle 20, 22, which means that the flow through the bypass duct 22 has a dedicated nozzle, which is separate from the engine core nozzle 20 and is radially on the outside with respect to the latter. However, this is not restrictive, and any aspect of the present disclosure can also apply to engines in which the flow through the bypass duct 22 and the flow through the core 11 are mixed or combined in front (or upstream) of a single nozzle, which can be referred to as a mixed flow nozzle. One or both nozzles (whether mixed-flow or split flow) can have a fixed or variable range. Although the example described relates to a turbofan engine, the disclosure can be used, for example, in any type of gas turbine engine, e.g. an open-rotor engine (in which the fan stage is not surrounded by an engine nacelle) or a turboprop engine. In some arrangements, the gas turbine engine 10 may not include a transmission 30.

The geometry of the gas turbine engine 10 and components thereof is/are defined by a conventional axis system which comprises an axial direction (which is aligned with the axis of rotation 9), a radial direction (in the direction from the bottom up in FIG. 1) and a circumferential direction (perpendicular to the view in FIG. 1). The axial, the radial and the circumferential directions are perpendicular to one another.

In the context of the present invention, an acoustic lining of the flow path boundary in the region in front of the fan 23 is significant, wherein the acoustic lining serves to damp the noise generated by the engine, in particular the noise generated by the fan.

Figure 4:
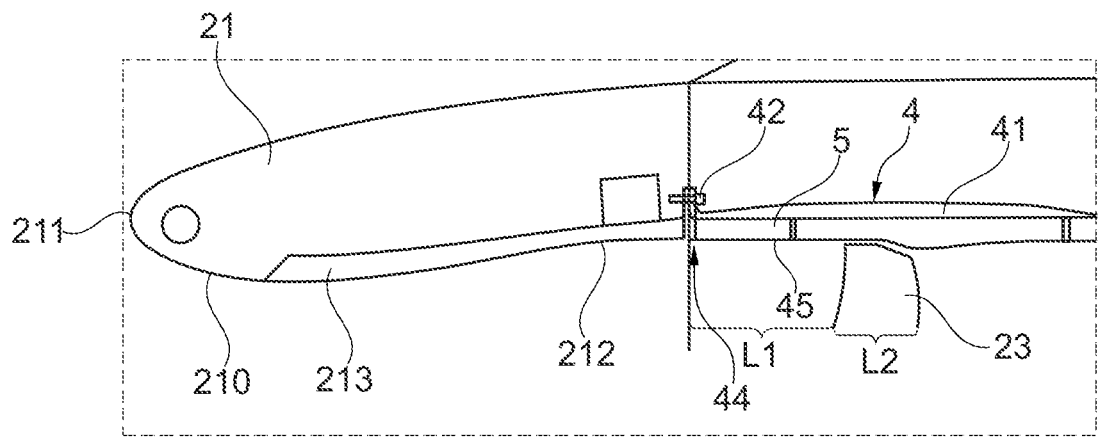
FIG. 4 shows a section through a section of an engine nacelle comprising an engine inlet and a fan housing.

FIG. 4 shows a front section of an engine nacelle 21, which comprises an engine inlet 210 and a fan housing 4. At the inlet of the engine, the engine inlet 210 comprises an inlet lip 211, which forms the front end of the engine nacelle 21. Adjoining this, the engine inlet 210 forms an inlet diffuser 212, in which the cross-sectional area of the flow path through the engine nacelle 21 which is bounded radially on the outside by the inlet diffuser 212 increases continuously. The engine inlet 210 or the inlet diffuser 212 is bounded radially on the outside by the inside of the engine nacelle 21.

In the region of the inlet diffuser 212, the engine inlet 210 has a sound-absorbing lining 213 made from a sound-absorbing material.

The fan housing 4 comprises structural housing components 41, which are illustrated only schematically and the precise construction of which is not of significance for the invention. On the inside, the fan housing 4 forms an interior surface 45, which forms the radially outer boundary of the flow path through the turbofan engine in the region of the fan housing 2. The fan 23 has a plurality of fan blades, which are connected to a fan disk (not illustrated). Here, the annulus of the fan disk forms the radially inner boundary of the flow path through the fan.

The engine inlet 210 is connected to the fan housing 4 via a flange connection 42. The flange connection 42 is also referred to as an A1 connection.

The interior surface 45 of the fan housing 4 is divided in the axial direction into two regions, which correspond to the lengths L1 and L2 and are referred to below as L1 and L2. The first region L1 extends from a housing start 44 of the fan housing 4 arranged on the upstream side as far as the second region L2. The second region L2 is characterized by its position radially on the outside adjoining the fan blades of the fan 23.

The first region L1 of the interior surface 25 has a sound-absorbing lining 5. This can be formed directly adjoining the housing start 44. Provision can be made here for the interior surface 45 to have a constant diameter in the first region L1, i.e. the sound-absorbing lining 5 is designed as a hollow cylinder.

During the assembly of the engine, the fully assembled fan 23 is inserted into the fan housing 2 from the front. In the case of a sound-absorbing lining in accordance with the prior art, the sound-absorbing lining is then inserted axially into the fan housing 4. After this, the engine inlet 210 is connected to the fan housing 4, this being accomplished by means of the flange connection 42. During disassembly, e.g. to renew the sound-absorbing lining 5 after damage due to foreign body impact, the lining is pulled axially out of the fan housing 4. For this purpose, the engine inlet must first of all be released again from the A1 flange.

In the case of the nacelle section illustrated schematically in FIG. 4, a sound-absorbing lining 213, 5 is provided in the engine inlet 210, on the one hand, and in the fan housing 4, on the other hand, and is thus provided in two different sections of the flow path boundary. Here, both these sound-absorbing linings 213, 5 delimit the flow path through the engine nacelle 21 over a defined axial length in the region axially in front of the fan 23. By means of the following figures, an embodiment according to the invention of a sound-absorbing lining is described with reference to the sound-absorbing lining 5 on the fan housing 4. However, it is alternatively or additionally also possible, in principle, for the lining 213 formed in the engine inlet 210 to be designed in the manner described below completely or in sections.

Figure 5:
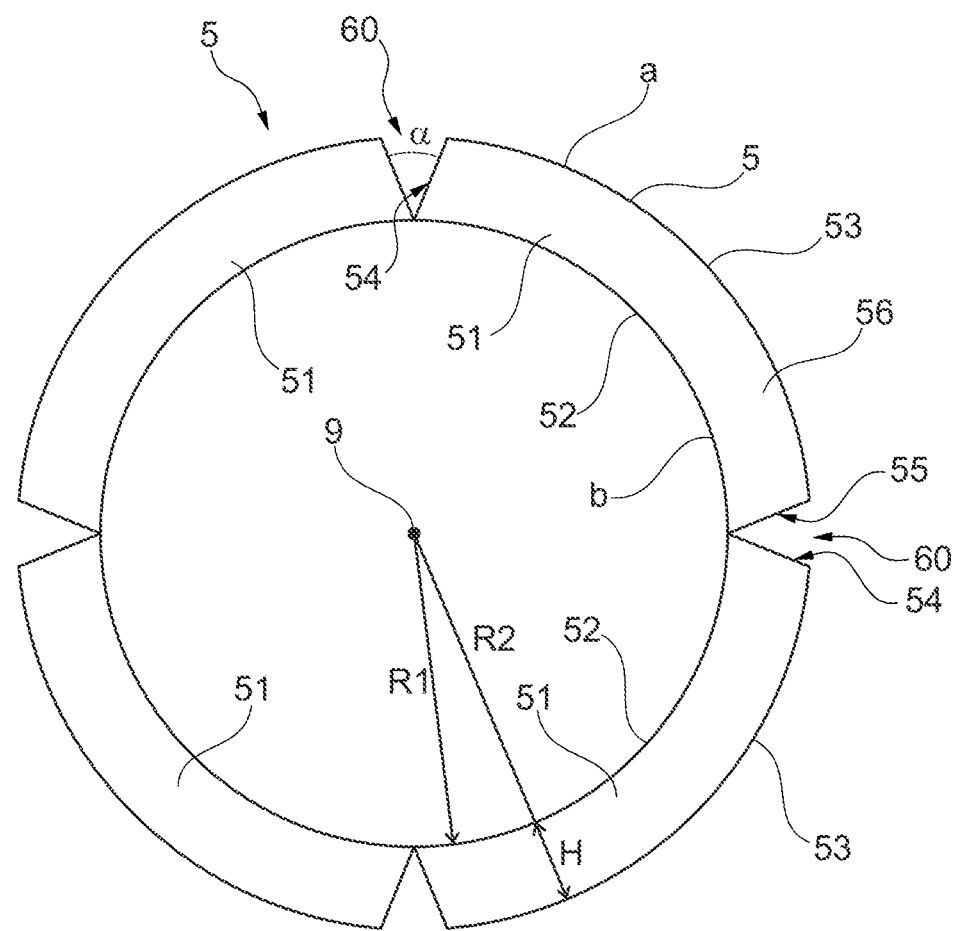
FIG. 5 shows a schematic cross section through one illustrative embodiment of a sound-absorbing lining comprising a plurality of sound-absorbing panels, which are each beveled on the end faces thereof.

FIG. 5 shows schematically and not to scale a sound-absorbing lining 5 in a cross section, i.e. in a section plane which is perpendicular to the longitudinal axis or machine axis 9 of the engine. The sound-absorbing lining 5 has a plurality of sound-absorbing panels 51. In the illustration in FIG. 5, four such panels are formed. However, this should only be taken as an example.

Each panel 51 has an inside 52 and an outside 53. Since the sound-absorbing lining 5 is of circular design overall and lines a circumferential range of 360°, both the inside 52 and the outside 53 are curved in a circular arc. The inside 52 extends along a radius R1. The outside 53 extends along a radius R2. The difference between the two radii R1, R2 defines the total thickness H of the panel 51. Between the inside 52 and the outside 53, the panel 51 has a layer 56 made from a honeycomb material through which flow can occur, as will be explained below.

Each panel 51 furthermore has two end faces 54, 55. The end faces 54, 55 are each of beveled design, with the result that two mutually adjoining panels 51 form a V-shaped gap 60 when viewed in section. The situation here is such that the end faces 54, 55 adopt an acute angle to the inside 52 and an obtuse angle to the outside 53 of the panel 51. The angle α between the end faces 54, 55 is in a range greater than zero and less than 45°, in particular in a range between 35° and 45°, for example. The end faces 54, 55 extend in the axial direction. Here, the fact that the sound-absorbing panels 51 are of beveled design on the end faces 54, 55 thereof, means that the end faces 54, 55 do not extend exactly in the radial direction.

Provision is made for the two end faces 54, 55 to be beveled in the same way, i.e. each to be beveled by the angle α/2 relative to the radial direction. In principle, however, it is also possible as an alternative for the two end faces to be beveled in different ways.

The inside 52 has an arc length b between the two end faces 54, 55. The outside 53 has an arc length a between the two end faces 54, 55. If—as in the prior art—the panels 51 did not have beveled end faces 54, 55, the end faces of adjacent panels 51 would rest against each other. The arc length b would then be less than the arc length a. According to the embodiment in FIG. 5 with the formation of a gap 60 between the end faces 54, 55 of adjacent panels 51, the arc length a of the outside 53 is shorter than the solution in the prior art. In this context, it is possible to provide embodiments in which the arc length a is even longer than the arc length b. At the same time, one embodiment envisages that the two arc lengths a, b are identical. In variant embodiments, it is also possible to envisage that the arc length a is shorter than the arc length b. The choice of the two arc lengths can be varied from application to application in consideration of the balance between a configuration of the panel which is as uniform as possible acoustically in the circumferential direction and greater ease of removal of the panel radially.

By virtue of the formation of V-shaped gaps 60 between the beveled end faces 54, 55 of adjacent panels 51, it is possible to remove the panels 51 radially inwards from the sound-absorbing lining 5 during disassembly. In corresponding fashion, the panels 561 can be inserted radially outwards into the sound-absorbing lining 5 for assembly. Such a radial assembly direction is made possible by the gaps 60. It would not be possible if the end faces of adjacent panels 51 were to rest against one another without the formation of a gap.

Figure 6:
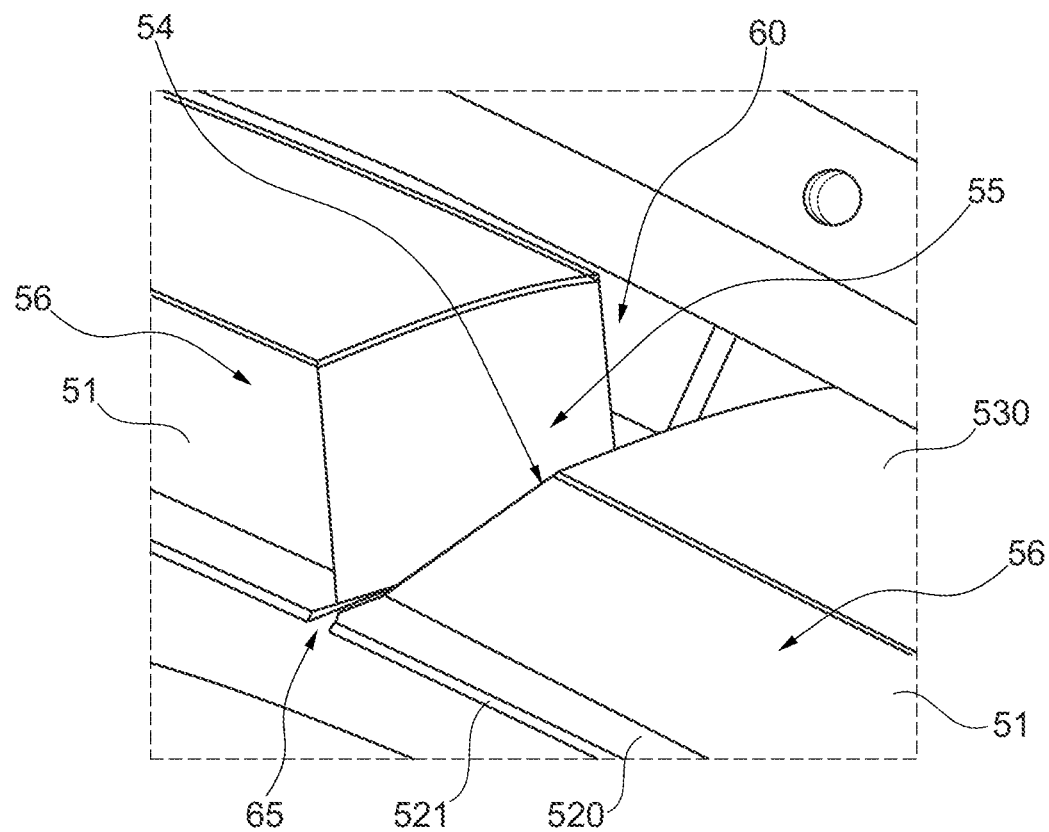
FIG. 6 shows a perspective view of one illustrative embodiment of a sound-absorbing lining, illustrating the layer structure and the beveled end faces of two mutually adjoining panels.

FIG. 6 shows a more specific illustrative embodiment of the invention in perspective. According to FIG. 5, two adjacent panels 51 are illustrated, each forming beveled end faces 54, 55 that form between them a V-shaped gap 60. The panels 51 are of sandwich-type design.

The inside 52 of the panels 51 is formed by an acoustically permeable layer 520 with an optimized flow resistance. This layer can be a perforated structure having cylindrical holes with a diameter in a range between 0.5 mm and 2 mm, for example. The thickness of this layer is in a range between 0.5 mm and 4 mm, ideally between 0.5 and 1.5 mm, for example. On the inside, the acoustically permeable layer 520 can be provided with an additional covering layer 521, although this is only optional.

Adjoining the acoustically permeable layer 520 is a layer 56 made from a light material of low flow resistance, in which the clear height of the cells contained therein determines the frequency to which the panels are tuned. The layer 56 is optimized for the respective application and has a thickness between 2 and 4 cm, for example. The layer 56 is of a honeycomb or rectangular design and accordingly comprises a multiplicity of cells, which each extend in the radial direction. The cell structure can comprise a multiplicity of possible materials, e.g. glass fibers, aluminum or Nomex®. This layer can also have one or more further, acoustically permeable layers (septum) in an orientation virtually perpendicular to the cross-sectional axis of the cells. Examples for such honeycomb structures with and without a septum are also commercially available and are distributed by Hexcel Corporation, Stamford, USA and Easy Composites Ltd., Longton, UK.

The outside 53 of the panels 51 is formed by a covering layer 530. The covering layer 530 can also be omitted or its function can be incorporated into the component adjoining the acoustic panel radially on the outside. The covering layer 530 is impermeable, apart from exceptions for the discharge of liquids, and can also perform structural tasks. In this case, the covering layer 530 closes the substantially radially oriented honeycomb cells of the layer 56 at one end thereof, giving rise to cells which allow the formation of vertical acoustic signals.

FIG. 6 furthermore shows that a small gap 65 extending in the circumferential direction extends on the inside 520, 521 between two adjoining panels 51. Such a gap 65 is unavoidable owing to manufacturing tolerances. It is in a range between 0.1 mm and 4 mm, for example.

According to one variant embodiment, provision can be made for the gap 60 between the end faces 54, 55 and/or the gap 65 on the inside 520, 521 to be completely or partially filled with a filler material (not shown). This is, for example, silicone or some other flexible material, which is used to seal the gap after the insertion of the panels. During disassembly, the filler material is either compressed, allowing a panel 51 to be removed inwards in a radial direction, or the filler material is removed before radial removal.

Figure 7:
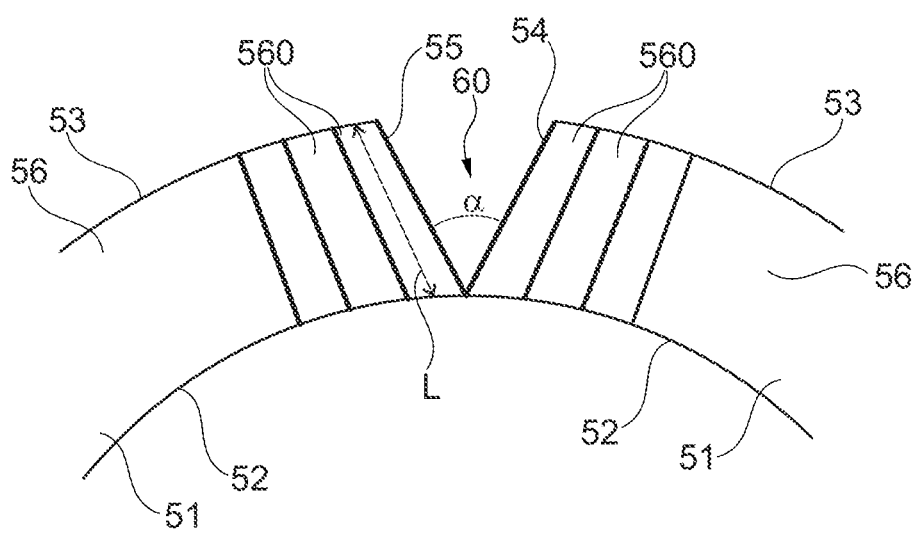
FIG. 7 shows schematically one illustrative embodiment, in which the honeycomb cells of a honeycomb structure on the end faces of two sound-absorbing panels extend parallel to the respective end faces.

FIG. 7 shows an advantageous embodiment and orientation of the honeycomb cells 560 of the honeycomb structure of the layer 56 in FIG. 6 in the region of a gap 60. The inside 52 and the outside 53 of the panels 51 are illustrated schematically. It is envisaged that the honeycomb cells 560 which adjoin the respective end face 54, 55 extend parallel to the respective end face 54, 55. They are thus not cut into or cut through and hence form acoustically active cells, which can perform sound absorption, even adjoining the end faces 54, 55. The overall absorption of the sound-absorbing panel is thereby improved.

According to a variant embodiment, the length of the honeycomb cells 560 increases towards the end faces 54, 55 of a panel. Owing to its oblique orientation, the length L of a honeycomb cell 560 adjoining an end face 54, 55 is thus greater than the total thickness H of the panel 51, cf. FIG. 5. This ensures that the total thickness of the panels 51 is constant along the entire circumference. As an alternative, provision can be made for the total thickness of the panels to decrease towards the end faces 54, 55.

With increasing distance from the end faces 54, 55 the honeycomb cells 560 become progressively more upright and, further towards the center of the panel, extend substantially in a radial direction.

Figure 8:
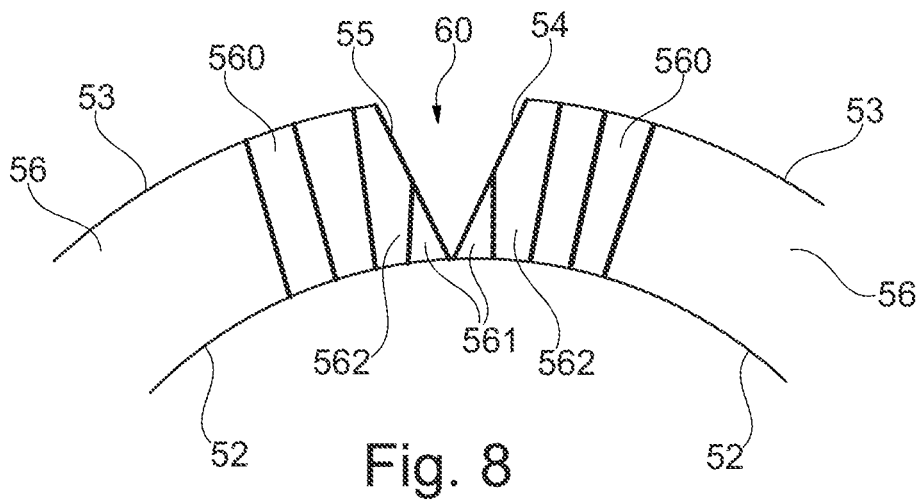
FIG. 8 shows schematically one illustrative embodiment, in which the honeycomb cells of a honeycomb structure on the end faces of two sound-absorbing panels are cut into.

FIG. 8 shows an alternative embodiment, in which the honeycomb cells 561, 562 do not extend parallel to the end faces 54, 55 adjoining the end faces 54, 55, which form a gap 60 between them. Accordingly, the cells 561, 562 are cut into. The corresponding acoustic cells no longer attain the depth required for sound absorption at a particular frequency. Sound absorption by these cells is no longer possible or is possible only to a lesser extent. However, attention is drawn to the fact that the embodiment in FIG. 8 also represents a variant of the present invention. The advantage of being able to remove the panels 51 radially is still present. This variant can be chosen in the case of panels which are not acoustically active, for example.

With reference to FIGS. 9a, 9b and 10a, 10b, an explanation is given below, using calculations that have been performed, to the effect that the acoustic absorption properties of the sound-absorbing lining in the case of the formation of a gap between the end faces of mutually adjoining panels is impaired only insignificantly, if at all.

Figure 9A:
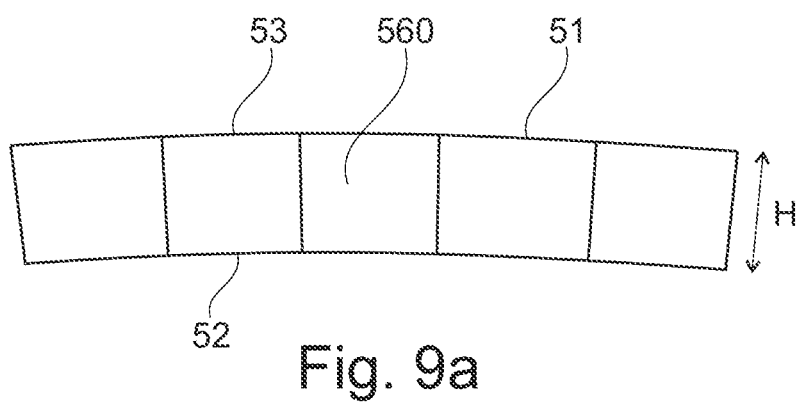
FIG. 9a shows a sound-absorbing panel with a conventional honeycomb structure.
Figure 9B:
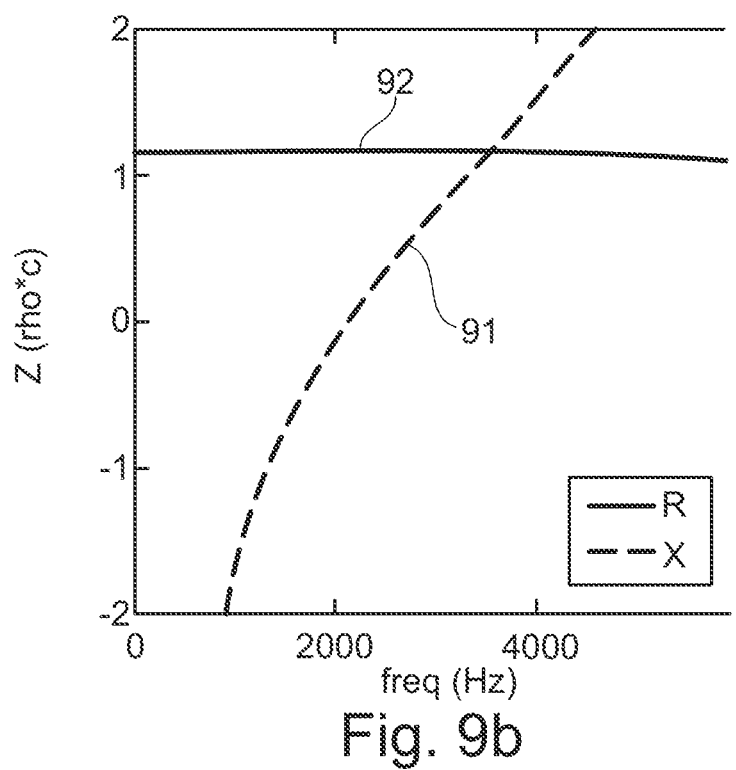
FIG. 9b shows the impedance of a sound-absorbing panel according to FIG. 9a as a function of the frequency.

Here, FIG. 9b shows measurements or predictions which were carried out for a conventional panel 51 in accordance with FIG. 9a. FIG. 9b illustrates the impedance Z as a function of frequency. Here, curve 91 shows the reactance and curve 92 shows the resistance.

Figure 10A:
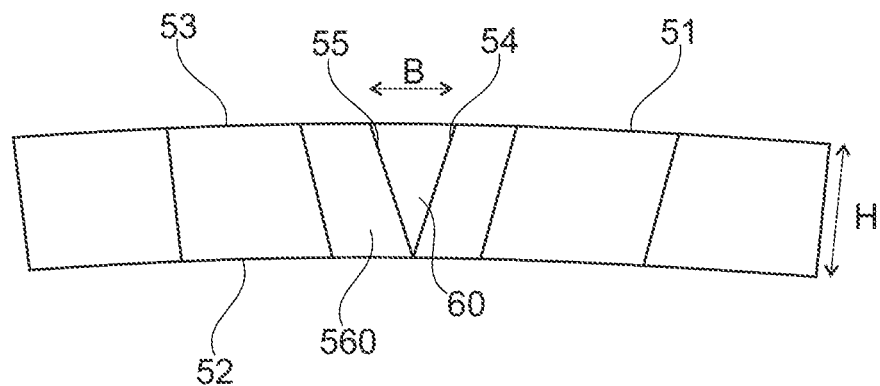
FIG. 10a shows a sound-absorbing panel with beveled end faces and a honeycomb structure corresponding to FIG. 7.
Figure 10B:
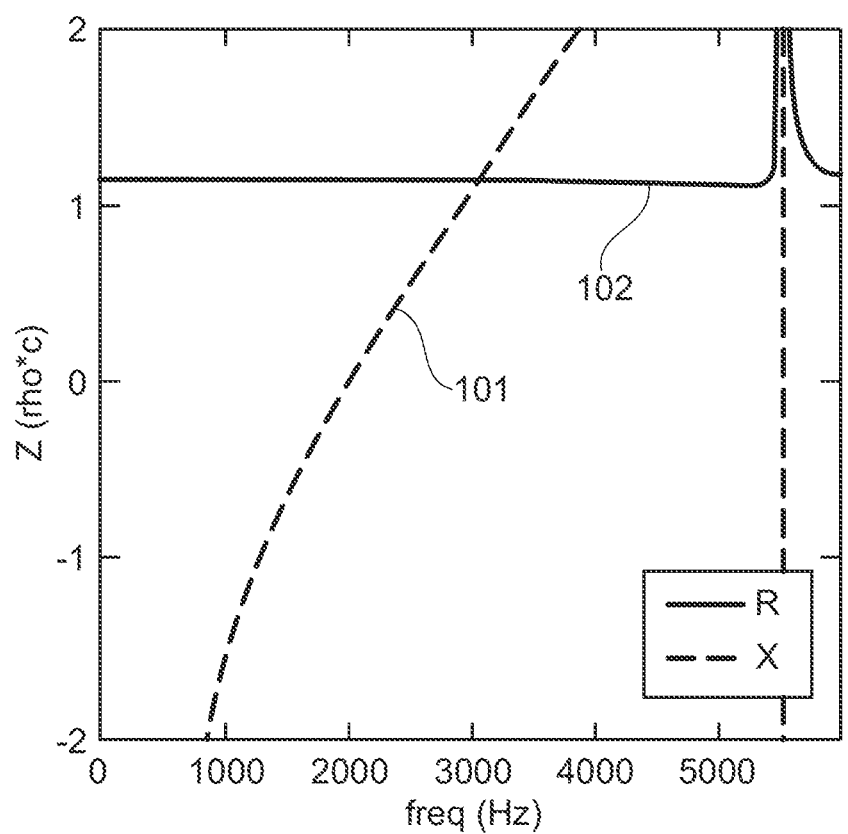
FIG. 10b shows the impedance of a sound-absorbing panel according to FIG. 10a as a function of the frequency.

FIG. 10b shows measurements or predictions which were carried out for a panel 51 with a gap 60 in accordance with FIG. 10a. FIG. 10b likewise illustrates the impedance Z as a function of frequency, wherein curve 101 shows the reactance and curve 102 shows the resistance.

In the case of both measurements, the panel 51 had a total thickness or height H of 2.54 cm. The construction and the materials of the panel were identical in each case. In the case of the calculations relating to FIG. 10b, the width B of the gap 60 on the outside 53 (cf. FIG. 10a) is 36 mm. The honeycomb cells 560 adjoining the gap 60 extend parallel to the respective end face 54, 55. The impedance curve of FIG. 10b is substantially unchanged in comparison with the impedance curve of FIG. 9b. Only the zero crossing of the reactance in curve 101 in FIG. 10b is shifted slightly to the left. This means that the frequency which is absorbed to the greatest extent is slightly reduced. The evaluation and acceptance of this frequency shift, as compared with known modifications of the impedance, is based on tolerances that are present in any case. For acceptable implementations, it is so small that no additional disadvantages or risks arise in respect of sound absorption. By means of experiments and calculations, it is thus possible to identify acceptable implementations of the invention for a particular application. An increase in the resistance 102 in FIG. 10b at frequencies higher than 5000 Hz is irrelevant in this case because absorption is in any case low here owing to the fact that the cell depth is not optimized for this frequency.

It is self-evident that the invention is not restricted to the embodiments described above and that various modifications and improvements can be made without deviating from the concepts described here. In particular, it is obvious that the sound-absorbing lining can also be formed in other sections of the engine, particularly in the inlet diffuser 212 of the engine inlet 210, cf. FIG. 4. In principle, the sound-absorbing lining 213 provided there can be manufactured in one piece as a barrel-like 360° structure. In the case of large wall thicknesses, for example, the lining 213 can alternatively be designed in accordance with FIGS. 5-8.

Moreover, any of the features can be used separately or in combination with any other features, as long as these are not mutually exclusive, and the disclosure extends to all combinations and subcombinations of one or more features which are described here and includes these. Where ranges are defined, these include all the values within these ranges and all the partial ranges which fall within a range.

The invention claimed is:

1. A gas turbine engine for an aircraft, comprising:
   a flow path boundary, which radially delimits an exterior of a flow path through the gas turbine engine, and
   a lining, which lines an interior of the flow path boundary, along an axial section,
   the lining comprising a plurality of panels adjoining each other in a circumferential direction of the flow path boundary, and together lining a circumferential area of 360°, each of the plurality of panels including two end faces, which each adjoin a respective end face of an adjacent one of the plurality of panels, the two end faces being beveled such that two mutually adjoining ones of the plurality of panels form a V-shaped gap therebetween, with minimum clearance of the V-shaped gap being positioned at an internal side of the two mutually adjoining ones of the plurality of panels;

each of the plurality of panels including a layer which, when laid out flat, consists of prismatic cells with a polygonal base surface; and the prismatic cells on each of the two end faces extending parallel to the respective one of the two end faces.

2. The gas turbine engine according to claim 1, wherein the V-shaped gap is formed in such a way to allow each of the plurality of panels to be removed radially inwards from the lining during disassembly of the lining.

3. The gas turbine engine according to claim 1, wherein an angle of the V-shaped gap is greater than 0° and less than or equal to 45°.

4. The gas turbine engine according to claim 1, wherein, in cross section, the plurality of panels have a radially inner interior curved in a circular arc and having a first arc length and a radially outer exterior curved in a circular arc and having a second arc length, a radial distance between the first arc length and the second arc length defining a total thickness of the plurality of panels, wherein the first arc length is equal to the second arc length.

5. The gas turbine engine according to claim 1, wherein the panels are sound-absorbing panels.

6. The gas turbine engine according to claim 1, wherein each of the plurality of panels has a sandwich construction including a covering layer including the layer consisting of the prismatic cells being positioned on a radially exterior of the each of the plurality of panels and a perforated inner layer positioned on a radially interior of the each of the plurality of panels.

7. The gas turbine engine according to claim 6, wherein the lining lines the flow path boundary in a region of a fan housing.

8. The gas turbine engine according to claim 7, wherein the covering layer is formed by a fan housing.

9. The gas turbine engine according to claim 1, wherein a total thickness of each of the plurality of panels is constant in an installed state.

10. The gas turbine engine according to claim 9, wherein a length of the prismatic cells increases towards each of the end faces.

11. The gas turbine engine according to claim 1, wherein the V-shaped shaped gap is filled at least partially with a filler material.

12. The gas turbine engine according to claim 1, wherein the lining has two to eight of the plurality of panels.

13. The gas turbine engine according to claim 1, and further comprising:

an engine core, which comprises a turbine, a compressor and a turbine shaft, which connects the turbine to the compressor and is hollow;

a fan, which is positioned upstream of the engine core, wherein the fan comprises a plurality of fan blades; and a transmission, which receives an input from the turbine shaft and outputs drive for the fan in order to drive the fan at a lower speed than the turbine shaft.

14. The gas turbine engine according to Claim 1, wherein the lining has four to six of the plurality of panels.

15. A panel for a gas turbine engine, which is provided and suitable for forming, together with further panels, a lining of a flow path boundary of a gas turbine engine, wherein the panel has two end faces, which are each provided to adjoin one end face of an adjacent panel, wherein the end faces are beveled such that two mutually adjoining panels form a V-shaped gap therebetween, with minimum clearance of the V-shaped gap being positioned at an internal side of the two mutually adjoining ones of the plurality of panels;

the panel including a layer which, when laid out flat, consists of prismatic cells with a polygonal base surface; and the prismatic cells on each of the end faces of the panel extending parallel to the respective end face.

16. The panel according to claim 15, wherein the beveled end faces allow for removal radially inwards from an anchoring point in the gas turbine engine during disassembly.

17. The panel according to claim 15, wherein the panel is a sound-absorbing panel.

* * * * *